(12) United States Patent
Henry

(10) Patent No.: US 10,397,570 B2
(45) Date of Patent: Aug. 27, 2019

(54) METHOD FOR ENCODING AND DECODING IMAGES, DEVICE FOR ENCODING AND DECODING IMAGES AND CORRESPONDING COMPUTER PROGRAMS

(71) Applicant: Orange, Paris (FR)

(72) Inventor: Felix Henry, Saint Gregoire (FR)

(73) Assignee: ORANGE, Paris (FR)

( * ) Notice: Subject to any disclaimer, the term of this patent is extended or adjusted under 35 U.S.C. 154(b) by 273 days.

(21) Appl. No.: 15/031,966

(22) PCT Filed: Oct. 21, 2014

(86) PCT No.: PCT/FR2014/052673
§ 371 (c)(1),
(2) Date: Apr. 25, 2016

(87) PCT Pub. No.: WO2015/059400
PCT Pub. Date: Apr. 30, 2015

(65) Prior Publication Data
US 2016/0277736 A1      Sep. 22, 2016

(30) Foreign Application Priority Data
Oct. 25, 2013   (FR) ..................................... 13 60444

(51) Int. Cl.
*H04N 19/119*     (2014.01)
*H04N 19/102*     (2014.01)
(Continued)

(52) U.S. Cl.
CPC ......... *H04N 19/119* (2014.11); *H04N 19/102* (2014.11); *H04N 19/157* (2014.11);
(Continued)

(58) Field of Classification Search
CPC .................................................... H04N 19/119
(Continued)

(56) References Cited

PUBLICATIONS

Gary J. Sullivan et al., "Overview of the High Efficiency Video Coding (HEVC) Standard", IEEE Transactions on Circuits and Systems for Video Technology. IEEE Service Center, Piscataway, NJ, US, vo. 22, No. 12, Dec. 1, 2012 (Dec. 1, 2012), pp. 1649-1668, XP011487803.*

(Continued)

*Primary Examiner* — Dave Czekaj
*Assistant Examiner* — Shanika M Brumfield
(74) *Attorney, Agent, or Firm* — David D. Brush; Westman, Champlin & Koehler, P.A.

(57) ABSTRACT

A method is providing for encoding at least one image cut into blocks. The method implements, for a current block to be encoded, acts of: predicting the current block in accordance with a prediction mode selected among predetermined prediction modes; obtaining a predictor block; determining a residual data set, representative of the difference between the predictor block obtained and the current block, the residual data being likely to have an amplitude and a sign; selecting, from the residual data set, a piece of residual data assigned an amplitude and a sign, using a predetermined criterion which is a function of the selected prediction mode; obtaining a predicted value of the sign of the selected piece of residual data; calculating information representing the difference between the predicted value of the sign and the value of the sign of the selected piece of residual data; and encoding the calculated information.

10 Claims, 5 Drawing Sheets

(51) Int. Cl.
  *H04N 19/157* (2014.01)
  *H04N 19/18* (2014.01)
  *H04N 19/184* (2014.01)
  *H04N 19/463* (2014.01)
  *H04N 19/176* (2014.01)

(52) U.S. Cl.
  CPC .......... *H04N 19/176* (2014.11); *H04N 19/18* (2014.11); *H04N 19/184* (2014.11); *H04N 19/463* (2014.11)

(58) Field of Classification Search
  USPC .......................................... 375/240.02–240.2
  See application file for complete search history.

(56) References Cited

PUBLICATIONS

Gary J. Sullivan et al., "Overview of the High Efficiency Video Coding (HEVC) Standard", IEEE Transactions on Circuits and Systems for Video Technology. IEEE Service Center, Piscataway, NJ, US, vo. 22, No. 12, Dec. 1, 2012 (Dec. 1, 2012), pp. 1649-1668, XP011487803. (Year: 2012).*

Joel Sole et al., "Transform coefficient Coding in HEVC", IEEE Transactions on Circuits and Systems for Video Technology. IEEE Service Center, Piscataway, NJ, US, vo. 22, No. 12, Dec. 1, 2012 (Dec. 1, 2012), pp. 1765-1777 (Year: 2012).*

Kazui (Fujitsu) et al., "Video coding technology proposal by Fujitsu", 1. JCT-VC Meeting; Apr. 15, 2010-Apr. 23, 2010; Dresden; (Jointcollaborative Team on Video Coding of ISO/IEC JTC1/SC29/WG11 and ITU-TSG.16 ) ; URL: http://wftp3.itu.int/av-arch/jctvc-site/, No. XP030007554.

Gary J Sullivan et al., "Overview of the High Efficiency Video Coding (HEVC) Standard", IEEE Transactions on Circuits and Systems for Video Technology. IEEE Service Center, Piscataway, NJ, US, vol. 22, No. 12, Dec. 1, 2012 (Dec. 1, 2012), pp. 1649-1668, XP011487803.

Nikolay N Ponomarenko et al "Prediction of signs of DCT coefficients in block-based lossy image compression", Proceedings of SPIE, vol. 6497. Feb. 15, 2007 (Feb. 15, 2007), pp. 1-8, XP055120970.

International Search Report dated Mar. 2, 2015 for corresponding International Application No. PCT/FR2014/052673, filed Oct. 21, 2014.

International Written Opinion and English Translation dated Apr. 26, 2016 for International Application No. PCT/FR2014/052673, filed Oct. 21, 2014.

Detlev Marpe et al., "Context-based adaptive binary arithmetic coding in the H.264/AVC video compression standard", IEEE Transactions on Circuits and Systems for Video Technology, vol. 13, No. 7, Jul. 1, 2003 (Jul. 1, 2003), pp. 620,-636.

Benjamin Bross et al. High Efficiency Video Coding (HEVC) text specification draft 10 *for EDIS & Consent), Joint Collaborative Team on Video Coding (JCT-VC) of ITU-T SG 16 P 3 and ISO/IEC JTC 1/SC 29/WG 11, 12th meeting: Geneva, CH, Jan. 14-23, 2013 (Jan. 14, 2013 through Jan. 23, 2013), document JCTVC-L1003_v10.

* cited by examiner

METHOD FOR ENCODING AND DECODING IMAGES, DEVICE FOR ENCODING AND DECODING IMAGES AND CORRESPONDING COMPUTER PROGRAMS

CROSS-REFERENCE TO RELATED APPLICATIONS

This application is a Section 371 National Stage Application of International Application No. PCT/FR2014/052673, filed Oct. 21, 2014, the content of which is incorporated herein by reference in its entirety, and published as WO 2015/059400 on Apr. 30, 2015, not in English.

FIELD OF THE INVENTION

The present invention relates generally to the field of image processing, and more specifically to the coding and decoding of digital images and of digital image sequences.

The coding/decoding of digital images applies notably to images from at least one video sequence comprising:
- images from a same camera and following one another in time (coding/decoding of 2D type),
- images from different cameras oriented according to different views (coding/decoding of 3D type),
- corresponding texture and depth components (coding/decoding of 3D type),
- etc. . . .

The present invention applies similarly to the coding/decoding of images of 2D or 3D type.

The invention can notably, but not exclusively, be applied to the video coding implemented in the current AVC and HEVC video coders with their extensions (MVC, 3D-AVC, MV-HEVC, 3D-HEVC, etc), and to the corresponding decoding.

PRIOR ART

The current video coders (MPEG, H.264, HEVC, . . . ) use a blockwise representation of the video sequence. The images are subdivided into blocks, which are likely to be subdivided again recursively. Then, each block is coded by intra-image or inter-image prediction. Thus, some images are coded by spatial prediction (intra prediction), while other images are coded by time prediction (inter prediction) in relation to one or more coded-decoded reference images, using a motion compensation known to those skilled in the art.

For each block, a residual block, also called prediction residue, is coded which corresponds to the original block minus a prediction. The residual blocks are transformed by a transform for example of discrete cosire transform (DCT) type, then quantized using a quantization for example of scalar type. Coefficients, of which some are positive and others are negative, are obtained at the end of the quantization step. They are then run through in a generally zigzag reading order (as in the JPEG standard), which makes it possible to exploit the large number of zero coefficients in the high frequencies. At the end of the abovementioned run-through, a one-dimensional list of coefficients is obtained, which will be called "quantized residue". The coefficients of this list are then coded by an entropic coding.

The entropic coding (for example of the arithmetic coding or Huffman coding type) is performed as follows:
- an information item is coded entropically to indicate the position of the last non-zero coefficient in the list,
- for each coefficient situated before the last non-zero coefficient, an information item is coded entropically to indicate if the coefficient is zero or not,
- for each non-zero coefficient indicated previously, an information item is coded entropically to indicate if the coefficient is equal to one or not,
- for each coefficient that is non-zero and not equal to one situated before the last non-zero coefficient, an amplitude information item (absolute value of the coefficient minus two) is coded entropically.

Thus, the amplitude of each coefficient is coded by taking into account the probability of appearance of these coefficients in the current block to be coded.

On the other hand, the signs which affect the non-zero coefficients are not coded entropically but coded respectively by a bit equal to '0' (for example for the + sign) or by a bit equal to '1' (for example for the − sign). These bits are inscribed in a signal or data stream which is intended to be transmitted to the decoder.

As is known per se, such a signal comprises:
- the quantized residues contained in the abovementioned list,
- information items representative of the coding mode used, in particular:
  - the prediction mode (intra prediction, inter prediction, default prediction producing a prediction for which no information item is transmitted to the decoder ("skip");
  - information items specifying the type of prediction (orientation, reference image, etc.);
  - the type of subdivision of the block;
  - the transform type, for example DCT 4×4, DCT 8×8, etc. . . .
  - the motion information items if necessary;
  - etc.

Given the many information items to be signaled in the stream, the result thereof is that the systematic addition of a sign bit into the stream to be transmitted to the decoder is costly in terms of bit rate and detrimental to the signal compression performance levels.

Once the stream has been received by the decoder, the decoding is done image by image, and, for each image, block by block. For each block, the corresponding elements of the stream are read. The inverse quantization and the inverse transformation of the coefficients of the blocks are performed to produce the decoded prediction residue. Then, the prediction of the block is computed and the block is reconstructed by adding the prediction to the decoded prediction residue.

The document "Prediction of signs of DCT coefficients in block-based lossy image compression, Nikolay N. Ponomarenko; Andriy V. Bazhyna; Karen O. Egiazarian, Proc. SPIE 6497, Image Processing: Algorithms and Systems V, 64970L (Feb. 27, 2007); doi:10.1117/12.713872" proposes coding one or more sign bits predictively, by taking into account their probability of appearance. In particular, it is chosen to predict the sign of the coefficient having the highest amplitude.

Such a prediction does indeed improve the coded data signal compression performance levels. However, the coefficient for which the sign is predicted does not necessarily result from an optimum choice, such that the sign prediction applied is likely to result in disturbances in the signal transmitted to the decoder. Such disturbances inevitably damage the video compression efficiency.

SUMMARY OF THE INVENTION

An exemplary embodiment of the present disclosure relates to a method for coding at least one image subdivided into blocks, implementing, for a current block to be coded, the steps of:
predicting the current block in accordance with a prediction mode selected from a plurality of predetermined prediction modes,
obtaining a predictor block,
determining a set of residual data representative of the difference between the predictor block obtained and the current block, the residual data being likely to have an amplitude and a sign.

The coding method according to the invention is noteworthy in that it implements the following steps:
selecting, from the set of residual data, at least one residual datum assigned an amplitude and a sign, using a predetermined criterion which is a function of the selected prediction mode,
obtaining a predicted value of the sign of said at least one selected residual datum,
computing an information item representative of the difference between the predicted value of the sign and the value of the sign of said at least one selected residual datum,
coding the computed information item.

Such an arrangement has the advantage of taking account of the current block prediction mode to predict the sign of one or more residual data, which makes it possible to identify the residual datum or data for which the sign is the most predictable. With such an identification being more reliable than in the abovementioned prior art, it makes it possible to obtain better compression performance levels for the data signal to be transmitted to the decoder, and, ultimately, a better quality of reconstruction of the image on the decoder.

According to a particular embodiment, the step of obtaining the predicted value of the sign of said at least one selected residual datum is a function of previously coded then decoded pixels of the current image which are situated along the current block.

Such an arrangement thus makes it possible to minimize the discontinuities that are likely to appear along the boundaries of the current block, while better corresponding to the reality of the image.

According to another particular embodiment, the predetermined criterion for selecting said at least one residual datum consists of a table which associates, with each of the predetermined prediction modes, an ordered list of the residual data, the order of the residual data of a list being variable from one prediction mode to another.

Such an arrangement makes it possible, for a particular prediction mode, to easily and accurately select the coefficient or coefficients for which the corresponding sign is the most predictable, without the prediction of these signs resulting in high disturbances in the signal to be transmitted to the decoder.

The result thereof is an increase in the compression performance levels of the coder while effectively reducing the signaling cost.

The various abovementioned embodiments or features can be added independently or in combination with one another, to the steps of the coding method as defined above.

The invention relates also to a device for coding at least one image subdivided into blocks, comprising, for a current block to be coded:
a module for predicting the current block in accordance with a prediction mode selected from a plurality of predetermined prediction modes,
a module for determining a set of residual data representative of the difference between a predictor block, obtained following the activation of the prediction module, and the current block, the residual data being likely to have an amplitude and a sign.

Such a coding device is noteworthy in that it further comprises:
a module for selecting, from the set of residual data, at least one residual datum assigned an amplitude and a sign, using a predetermined criterion which is a function of the selected prediction mode,
a module for obtaining a predicted value of the sign of said at least one selected residual datum,
a module for computing an information item representative of the difference between the predicted value of the sign and the value of the sign of said at least one selected residual datum,
a module for coding the computed information item.

Such a coding device is suitable for implementing the abovementioned coding method.

Correspondingly, the invention relates also to a method for decoding a data signal representative of at least one image subdivided into blocks, implementing, for a current block to be decoded, the steps of:
determining, in the data signal, a set of residual data relative to the current block, at least one residual datum of the abovementioned set being assigned an amplitude and a sign,
predicting the current block in accordance with a prediction mode selected from a plurality of predetermined prediction modes.

Such a decoding method is noteworthy in that it implements the following steps:
selecting, from the set of residual data, at least one residual datum assigned an amplitude and a sign, using a predetermined criterion which is a function of the determined prediction mode,
obtaining a predicted value of the sign of said at least one selected residual datum,
determining, in the data signal, an information item representative of the difference between the predicted value of the sign and the value of the sign of said at least one selected residual datum,
reconstructing the sign using the predicted value of the sign and of the determined representative information item.

According to a particular embodiment, the step of obtaining the predicted value of the sign of said at least one selected residual datum is a function of previously decoded pixels of the current image which are situated along the current block.

According to another particular embodiment, the predetermined criterion for selecting said at least one residual datum consists of a table which associates, with a determined prediction mode, an ordered list of the residual data, the order of the residual data of a list being variable from one prediction mode to another.

The various abovementioned embodiments or features can be added independently or in combination with one another, to the steps of the decoding method as defined above.

Correlatively, the invention relates also to a device for decoding a data signal representative of at least one image subdivided into blocks, comprising, for a current block to be decoded:
- a module for determining, in the data signal, a set of residual data relative to the current block, at least one residual datum of the abovementioned set being assigned an amplitude and a sign,
- a module for predicting the current block in accordance with a prediction mode selected from a plurality of predetermined prediction modes.

Such a decoding device is noteworthy in that it further comprises:
- a module for selecting, from the set of residual data, at least one residual datum assigned an amplitude and a sign, using a predetermined criterion which is a function of the determined prediction mode,
- a module for obtaining a predicted value of the sign of said at least one selected residual datum,
- a module for determining, in the data signal, an information item representative of the difference between the predicted value of the sign and the value of the sign of said at least one selected residual datum,
- a module for reconstructing the sign using the predicted value of the sign and of the determined representative information item.

Such a decoding device is suitable for implementing the abovementioned decoding method.

The invention relates also to a computer program comprising instructions for implementing one of the coding and decoding methods according to the invention, when it is run on a computer.

This program can use any programming language, and be in the form of source code, object code, or intermediate code between source code and object code, such as in a partially compiled form, or in any other desirable form.

The invention also targets a computer-readable storage medium on which is stored a computer program, this program comprising instructions suitable for implementing one of the coding or decoding methods according to the invention, as described above.

The invention also targets a computer-readable storage medium on which is stored a computer program, this program comprising instructions suitable for implementing the coding or decoding method according to the invention, as described above.

The storage medium can be any entity or device capable of storing the program. For example, the medium can comprise a storage means, such as a ROM, for example a CD ROM or a microelectronic circuit ROM, or even a magnetic storage means, for example a USB key or a hard disk.

Also, the storage medium can be a transmissible medium such as an electrical or optical signal, which can be routed via an electrical or optical cable, wirelessly or by other means. The program according to the invention can in particular be downloaded over a network of internet type.

Alternatively, the storage medium can be an integrated circuit in which the program is incorporated, the circuit being adapted to execute, or be used in the execution of, the abovementioned coding or decoding method.

The decoding method, the coding device, the decoding device, the computer programs and the abovementioned corresponding storage media offer at least the same advantages as those conferred by the coding method according to the present invention.

BRIEF DESCRIPTION OF THE DRAWINGS

Other features and advantages will become apparent on reading about a preferred embodiment described with reference to the figures in which.

DETAILED DESCRIPTION OF ILLUSTRATIVE EMBODIMENTS

Detailed Description of the Coding Part

An embodiment of the invention will now be described, in which the coding method according to the invention is used to code an image or a sequence of images according to a binary stream close to that that is obtained by a coding in accordance, for example, with the HEVC standard.

In this embodiment, the coding method according to the invention is for example implemented in a software or hardware manner by modifications to a coder initially conforming to the HEVC standard. The coding method according to the invention is represented in the form of an algorithm comprising steps C1 to C18 as represented in FIG. 1.

Figure 2:
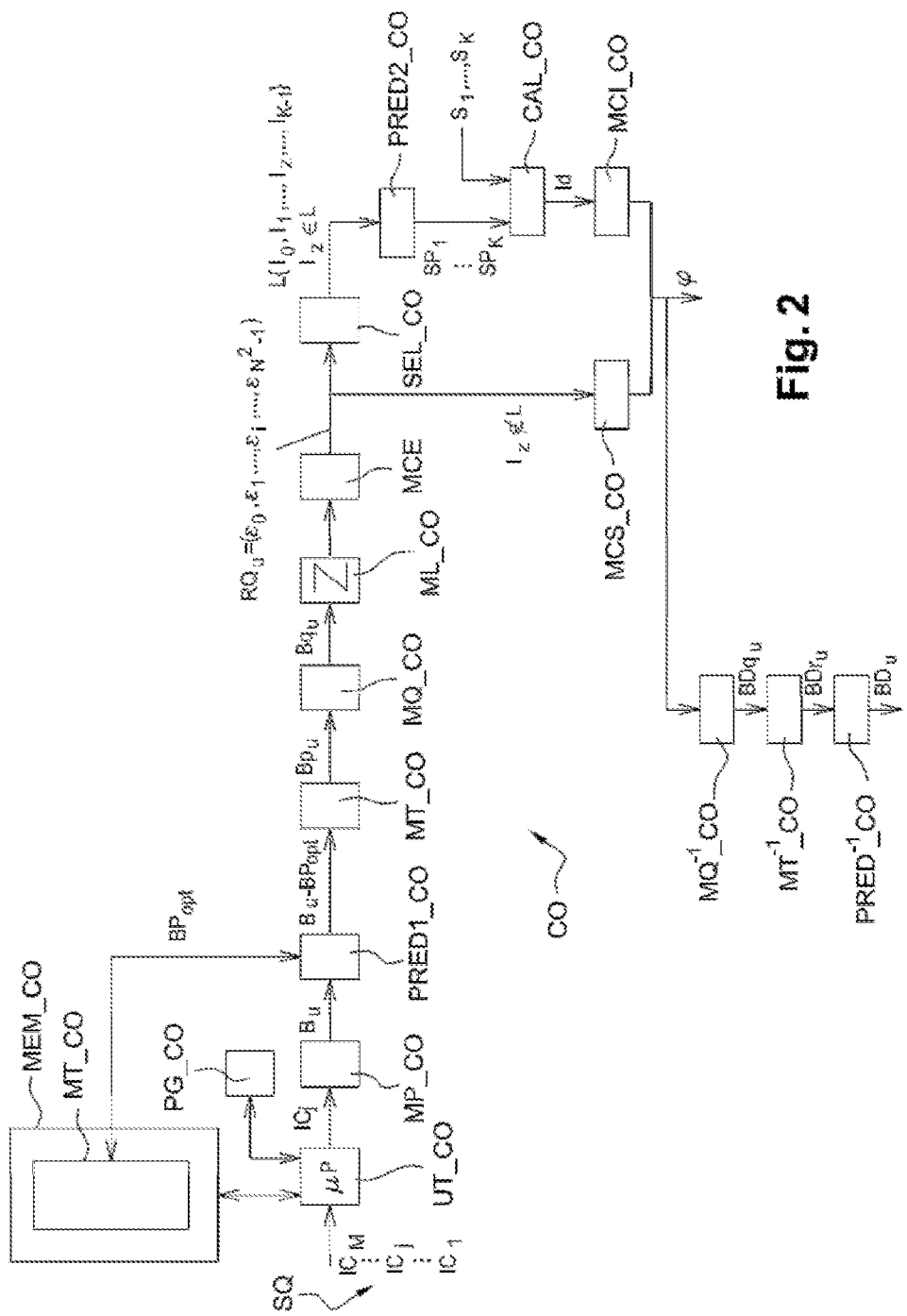
FIG. 2 represents an embodiment of a coding device according to the invention.

According to the embodiment of the invention, the coding method according to the invention is implemented in a coding device CO represented in FIG. 2.

As illustrated in FIG. 2, such a coding device comprises a memory MEM_CO comprising a buffer memory MT_CO, a processing unit UT_CO equipped for example with a microprocessor µP and driven by a computer program PG_CO which implements the coding method according to the invention. On initialization, the code instructions of the computer program PG_CO are for example loaded into a RAM memory (not represented) before being executed by the processor of the processing unit UT_CO.

Figure 1:
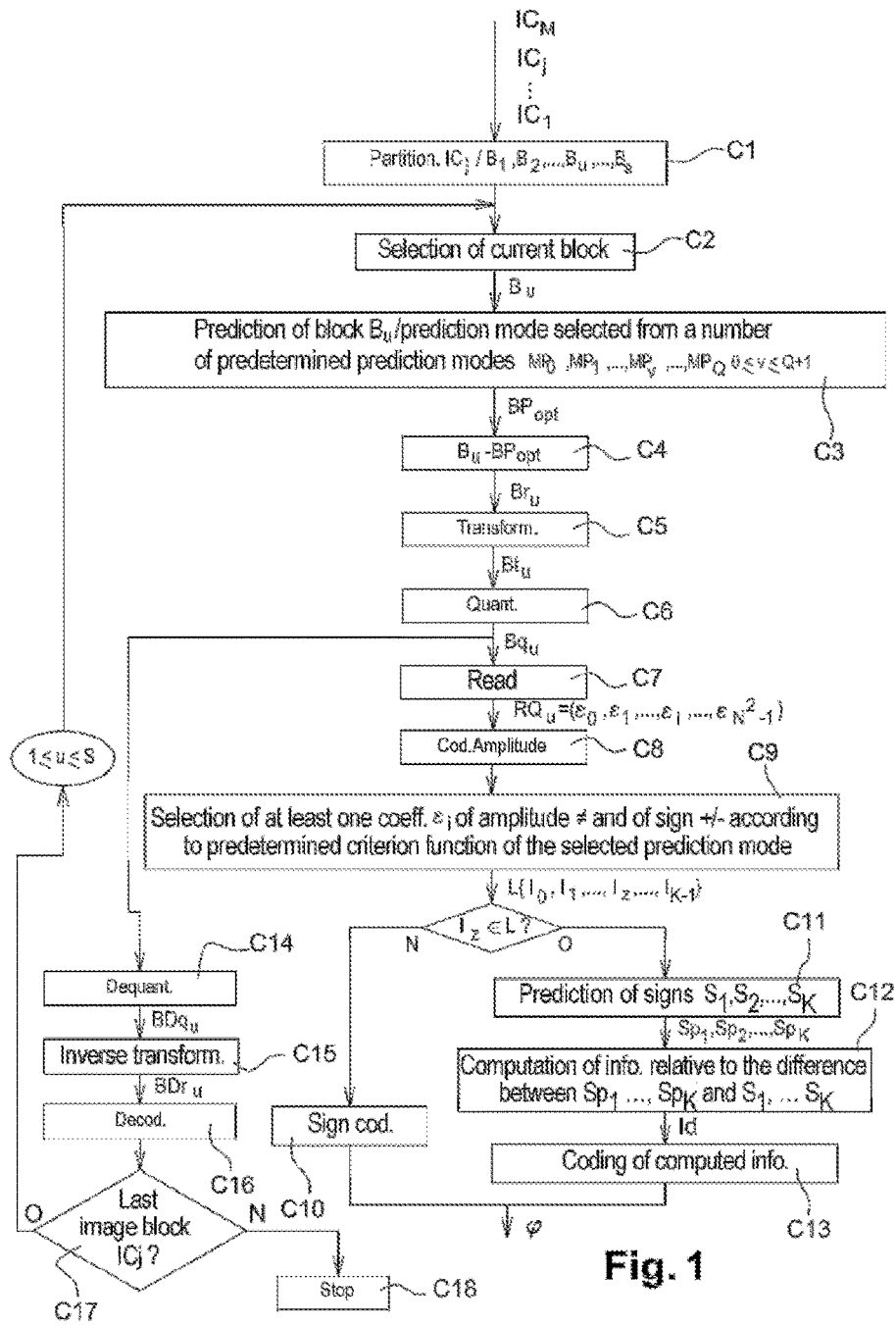
FIG. 1 represents the steps of the coding method according to the invention.

The coding method represented in FIG. 1 is applied to any current image of a sequence SQ of images to be coded.

During a step C1 represented in FIG. 1, the partition of a current image $IC_j$ belonging to the sequence SQ of images $IC_1, \ldots, IC_j, \ldots, IC_M$ ($1 \leq j \leq M$), into a plurality of blocks $B_1, B_2, \ldots, B_u, \ldots, B_S$ ($1 \leq u \leq S$), for example of 64×64 pixel size, is carried out in a manner known per se. Such a partitioning step is implemented by a partitioning software module MP_CO represented in FIG. 2, said module being driven by the microprocessor µP of the processing unit UT_CO.

Figure 3:
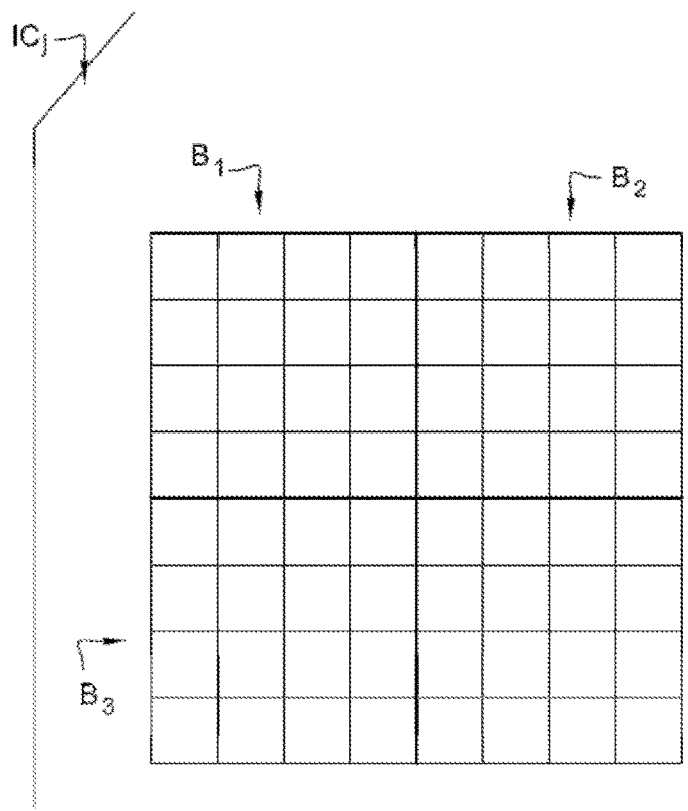
FIG. 3 represents an example of partitioning of the current image into a number of blocks of pixels.

The duly partitioned image $IC_j$ is represented in FIG. 3. In the example represented, the image $IC_j$ is partitioned into four blocks $B_1$, $B_2$, $B_3$ and $B_4$.

It should be noted that, within the meaning of the invention, the term "block" means coding unit. The latter terminology is used in particular in the HEVC standard, for example in the document "B. Bross, W.-J. Han, J.-R. Ohm, G. J. Sullivan, and T. Wiegand, "High efficiency video coding (HEVC) text specification draft 10," document JCTVC-L1003 of JCT-VC, Geneva, C H, 14-23 Jan. 2013".

In particular, such a coding unit groups together sets of pixels of rectangular or square form, also called blocks, macro blocks, or else sets of pixels exhibiting other geometrical forms.

Said blocks $B_1, B_2, \ldots, B_u, \ldots, B_S$ are intended to be coded in a predetermined running order, which is for example of raster scan type. This means that the blocks are coded one after the other, from left to right.

Other types of run-through are of course possible. Thus, it is possible to subdivide the image $IC_j$ into a number of sub-images called slices and to independently apply a subdivision of this type to each sub-image. It is also possible to code, not a succession of lines as explained above, but a succession of columns. It is also possible to run through the lines or columns in either direction.

In the example represented in FIG. 3, the blocks $B_1$, $B_2$, $B_3$ and $B_4$ have a square form and all have the same size. Depending on the size of the image, which is not necessarily a multiple of the size of the blocks, the last blocks on the left and the last blocks at the bottom may not be square. In an alternative embodiment, the blocks may, for example, be of rectangular size and/or not aligned with one another.

Each block may moreover itself be divided into subblocks which are themselves subdivisible.

During a step C2 represented in FIG. 1, the coder CO selects, as current block, a first block to be coded $B_u$ of the image $IC_j$, such as, for example, the first block $B_1$.

During a step C3 represented in FIG. 1, the current block $B_u$ is predicted by known intra and/or inter prediction techniques. To this end, the block $B_u$ is predicted in relation to at least one predictor block in accordance with a prediction mode selected from a plurality of predetermined prediction modes $MP_0, MP_1, \ldots, MP_v, \ldots, MP_Q$ in which $0 \leq v \leq Q+1$. In the example represented, the predetermined prediction modes are of intra type and Q is equal to 4.

Such a predictor block is, for example, a block of pixels which has already been coded or else coded then decoded or not. Such a predictor block is previously stored in the buffer memory MT_CO of the coder CO as represented in FIG. 2.

At the end of the prediction step C3, an optimum predictor block $BP_{opt}$ is obtained after said predetermined prediction modes have been put into competition with one another, for example by the minimization of a distortion bit rate criterion that is well known to those skilled in the art. The block $BP_{opt}$ is considered to be an approximation of the current block $B_u$. The information items relative to this prediction are intended to be inscribed in a signal or data stream to be transmitted to a decoder. Such information items notably comprise the type of prediction (inter or intra) and, if appropriate, the selected prediction mode, the type of partitioning of the current block if the latter has been subdivided, the reference image index and the displacement vector used in the case where an inter prediction mode has been selected. These information items are compressed by the coder CO.

During a step C4 represented in FIG. 1, the data relative to the current block $B_u$ are compared to the data of the predictor block $BP_{opt}$. More specifically, during this step, the difference between the predictor block obtained $BP_{opt}$ and the current block $B_u$ is conventionally computed.

A set of residual data, called residue $Br_u$ is then obtained at the end of the step C4.

The steps C3 and C4 are implemented by a predictive coding software module PRED1_CO represented in FIG. 2, said module being driven by the microprocessor µP of the processing unit UT_CO.

During a step C5 represented in FIG. 1, the residue block $Br_u$ is transformed according to a conventional direct transformation operation such as, for example, a discrete cosine transformation of DCT type or a wavelet transformation of DWT type, to produce a transformed block $Bt_u$. Such an operation is performed by a transform software module MT_CO, as represented in FIG. 2, said module being driven by the microprocessor µP of the processing unit UT_CO.

During a step C6 represented in FIG. 1, the transformed block $Bt_u$ is quantized according to a conventional quantization operation, such as, for example, a scalar or vector quantization. A block $Bq_u$ of N×N quantized coefficients is then obtained, in which N is an integer greater than or equal to 1. Such a step is performed by means of a quantization software module MQ_CO as represented in FIG. 2, said module being driven by the microprocessor µP of the processing unit UT_CO.

During a step C7 represented in FIG. 1, a run-through, in a predefined order, of the quantized coefficients of the block $Bq_u$ is carried out. In the example represented, this is a conventional zig-zag run-through, in increasing order of frequency. Such a step is performed by a reading software module ML_CO, as represented in FIG. 2, said module being driven by the microprocessor µP of the processing unit UT_CO.

At the end of the step C7, a one-dimensional vector $RQ_u = (\varepsilon_0, \varepsilon_1, \ldots, \varepsilon_i, \ldots, \varepsilon_{N^2-1})$ of coefficients is obtained, better known as "quantized residue", in which the index i varies from 0 to $N^2-1$.

During a step C8 represented in FIG. 1, the amplitude information items associated with each coefficient of the one-dimensional vector $RQ_u$ are coded. In the preferred embodiment, the coding performed is an entropic coding of arithmetic or Huffman type. The step C8 then consists in:
 reading the symbol or symbols of the predetermined set of symbols which are associated with said current block,
 associating digital information, such as bits, with the symbol(s) read.

Such an entropic coding step is implemented by an entropic coding software module MCE represented in FIG. 2, said module being driven by the microprocessor µP of the processing unit UT_CO. The entropic coding module MCE is for example of CABAC ("Context Adaptive Binary Arithmetic Coder") type. It can also be a Huffman coder that is known as such.

During a step C9 represented in FIG. 1, at least one coefficient $\varepsilon_i$ of the one-dimensional vector $RQ_u$ that has a non-zero amplitude and a + or − sign is selected.

According to the invention, such a selection is advantageously implemented using a predetermined criterion which is a function of the prediction mode selected in the prediction step C3.

Such a selection step is performed by a selection software module SEL_CO, as represented in FIG. 2, said module being driven by the microprocessor µP of the processing unit UT_CO.

According to the preferred embodiment of the step C9, said predetermined selection criterion consists of a table TA stored in a memory (not represented) of the coder CO which associates, with each of said predetermined prediction modes, an ordered list of the coefficients of the one-dimensional vector $RQ_u$, the order of the coefficients of a list being variable from one prediction mode to another.

An example of the table TA is represented below. In this example, there are sixteen of the coefficients $\varepsilon_0, \varepsilon_1, \ldots, \varepsilon_i, \ldots, \varepsilon_{N^2-1}$ and there are five predetermined prediction modes $MP_0, MP_1, MP_2, MP_3, MP_4$. The table TA then takes the following form:

| TA | Coefficients $\varepsilon_0, \varepsilon_1, \varepsilon_2, \varepsilon_3, \varepsilon_4, \varepsilon_5, \varepsilon_6, \varepsilon_7, \varepsilon_8, \varepsilon_9, \varepsilon_{10}, \varepsilon_{11}, \varepsilon_{12}, \varepsilon_{13}, \varepsilon_{14}, \varepsilon_{15}$ Sequencing of the Coefficients by Index i with $0 \le i \le 15$ | | | | | | | | | | | | | | | |
|---|---|---|---|---|---|---|---|---|---|---|---|---|---|---|---|---|
| Prediction Modes $MP_0$ | 0 | 1 | 2 | 3 | 4 | 5 | 6 | 7 | 8 | 9 | 10 | 11 | 12 | 13 | 14 | 15 |
| $MP_1$ | 8 | 9 | 10 | 11 | 12 | 13 | 14 | 15 | 0 | 1 | 2 | 3 | 4 | 5 | 6 | 7 |
| $MP_2$ | 4 | 5 | 6 | 7 | 8 | 9 | 10 | 11 | 0 | 1 | 2 | 3 | 12 | 13 | 14 | 15 |
| $MP_3$ | 12 | 13 | 14 | 15 | 0 | 1 | 2 | 3 | 4 | 5 | 6 | 7 | 8 | 9 | 10 | 11 |
| $MP_4$ | 15 | 14 | 13 | 12 | 11 | 10 | 9 | 8 | 7 | 6 | 5 | 4 | 3 | 2 | 1 | 0 |

During the selection step C9, the line in the table TA which corresponds to the prediction mode which was used to predict the current block $B_u$ is chosen. For example, if it is the prediction mode $MP_3$, the line of indexes of coefficients corresponding to this prediction mode is selected. The coefficients $\varepsilon_0$ to $\varepsilon_{15}$ are then run through in the order given by the line of indexes of selected coefficients, in other words, respectively, 12, 13, 14, 15, 0, 1, 2, 3, 4, 5, 6, 7, 8, 9, 10, 11. A test is then carried out in this order to see if the amplitude of each of the coefficients $\varepsilon_{12}, \varepsilon_{13}, \varepsilon_{14}, \varepsilon_{15}, \varepsilon_0, \varepsilon_1, \varepsilon_2, \varepsilon_3, \varepsilon_4, \varepsilon_5, \varepsilon_6, \varepsilon_7, \varepsilon_8, \varepsilon_9, \varepsilon_{10}, \varepsilon_{11}$ is zero or not. The first K non-zero amplitude values are retained, in which K is a value predetermined on the coder CO, such that $0 \le K \le N^2-1$.

Thus, if, for example, K is 2, and the coefficients of the one-dimensional vector $RQ_u$ are, for example, as follows: $\varepsilon_0=5, \varepsilon_1=0, \varepsilon_2=-6, \varepsilon_3=0, \varepsilon_4=0, \varepsilon_5=0, \varepsilon_6=1, \varepsilon_7=-1, \varepsilon_8=0, \varepsilon_9=3, \varepsilon_{10}=0, \varepsilon_{11}=0, \varepsilon_{12}=0, \varepsilon_{13}=0, \varepsilon_{14}=-3, \varepsilon_{15}=1$, the first two non-zero amplitude values identified are 3 ($\varepsilon_{14}$) and 1 ($\varepsilon_{15}$), which thus constitute a subset of identified coefficients. A list L containing the indexes of the coefficients identified in said subset is then constructed. In the example represented, L={14,15}.

According to an alternative embodiment, an order by increasing or decreasing non-zero amplitude of the coefficients of the one-dimensional vector $RQ_u$ is selected as a function of the predetermined prediction mode which was selected to predict the current block $B_u$.

In the case, for example, where there are two predetermined prediction modes $M_0$ and $M_1$:
- if it is the mode $M_0$ which has been selected to predict the current block, the first K coefficients of the one-dimensional vector $RQ_u$ are selected by decreasing non-zero amplitude,
- if it is the mode $M_1$ which has been selected to predict the current block, the K first coefficients of the one-dimensional vector $RQ_u$ are selected by increasing non-zero amplitude.

The inverse variant is also possible. In other words:
- if it is the mode $M_0$ which has been selected to predict the current block, the K first coefficients of the one-dimensional vector $RQ_u$ are selected by increasing non-zero amplitude,
- if it is the mode $M_1$ which has been selected to predict the current block, the K first coefficients of the one-dimensional vector $RQ_u$ are selected by decreasing non-zero amplitude.

The abovementioned examples of selection criterion are in no way limiting, provided that the criterion takes account of the prediction mode selected in the prediction step C3, to identify the coefficients whose sign will be the most predictable.

At the end of the selection step C9, a list $L=\{I_0, I_1, \ldots, I_z, \ldots, I_{K-1}\}$ is obtained containing the indexes of K coefficients of the one-dimensional vector $RQ_u$, in which $0 \le z < K$.

During a step C10 represented in FIG. 1, the signs of the coefficients of the one-dimensional vector $RQ_u$ whose indexes have not been retained in the list L are conventionally coded.

Such a coding step is performed by a sign coding software module MCS_CO, as represented in FIG. 2, said module being driven by the microprocessor µP of the processing unit UT_CO.

In the abovementioned example in which the coefficients of the one-dimensional vector $RQ_u$ are as follows: $\varepsilon_0=5, \varepsilon_1=0, \varepsilon_2=-6, \varepsilon_3=0, \varepsilon_4=0, \varepsilon_5=0, \varepsilon_6=1, \varepsilon_7=-1, \varepsilon_8=0, \varepsilon_9=3, \varepsilon_{10}=0, \varepsilon_{11}=0, \varepsilon_{12}=0, \varepsilon_{13}=0, \varepsilon_{14}=-3, \varepsilon_{15}=1$, the signs of the coefficients that are non-zero and whose indexes are not present in the list L={14, 15} are conventionally coded. The signs +, −, +, −, + corresponding respectively to the coefficients $\varepsilon_0, \varepsilon_2, \varepsilon_6, \varepsilon_7, \varepsilon_9$ are then coded in a manner known per se. Thus, for example, the + sign is coded by a zero bit, whereas the − sign is coded by a one bit.

During a step C11 represented in FIG. 1, the sign or signs of the coefficients whose indexes have been retained in the list L are predicted.

Such a sign prediction step is performed by a sign prediction software module PRED2_CO, as represented in FIG. 2, said module being driven by the microprocessor µP of the processing unit UT_CO.

In the case where a single sign is predicted, a single predicted sign value Sp is obtained.

In the case where K signs $S_1, S_2, \ldots, S_K$ are predicted, a number of predicted sign values $Sp_1, Sp_2, \ldots, Sp_K$ are respectively obtained.

In the abovementioned example in which L={14, 15}, two predicted sign values $Sp_1$ and $Sp_2$ are intended to be obtained.

According to an example of sign prediction that is known as such, for a current quantized residual block $Bq_u$ considered, as many decoded blocks as there are combinations of the signs of the coefficients whose indexes are contained in the list L are constructed. Generally, since there are two possible signs + or − for a coefficient, for a current quantized residual block $Bq_u$ considered:
- W current quantized residual blocks $Bq_{u0}, Bq_{u1}, \ldots, Bq_{uW-1}$, in which $W=2^K$ are constructed,
- W current quantized residual blocks $Bq_{u0}, Bq_{u1}, \ldots, Bq_{uW-1}$ are decoded to obtain, respectively, W decoded residual blocks $BDr_{u0}, BDr_{u1}, \ldots, BDr_{uW-1}$, using conventional dequantization and inverse prediction techniques,
- W decoded blocks $BDu_0, BDu_1, \ldots, BDu_{W-1}$ are reconstructed by adding, respectively, to W decoded residual blocks $BDr_{u0}, BDr_{u1}, \ldots, BDr_{uW-1}$, the predictor block $BP_{opt}$ obtained at the end of the abovementioned prediction step C3.

In the abovementioned example, there are two signs to be predicted, the − sign assigned to the coefficient $\varepsilon_{14}$ and the + sign assigned to the coefficient $\varepsilon_{15}$. These two signs can therefore take the values {+,+}, {+,−}, {−,+} and {−,−}.

Thus, for example, for the list L={14, 15}, $2^2$=4 residual blocks $Bq_{u0}$, $Bq_{u1}$, $Bq_{u2}$, $Bq_{u3}$ are obtained such that:

$Bq_{u0}$={5,0,−6,0,0,0,1,−1,0,3,0,0,0,3,1}
$Bq_{u1}$={5,0,−6,0,0,0,1,−1,0,3,0,0,0,3,−1}
$Bq_{u2}$={5,0,−6,0,0,0,1,−1,0,3,0,0,0,−3,1}
$Bq_{u3}$={5,0,−6,0,0,0,1,−1,0,3,0,0,0,−3,−1}

Each of these four residual blocks are decoded in such a way as to respectively obtain four decoded residual blocks $BDr_{u0}$, $BDr_{u1}$, $BDr_{u2}$, $BDr_{u3}$. Then, the predictor block $BP_{opt}$ obtained in the abovementioned prediction step C3 is added to each of these four decoded residual blocks, which makes it possible to obtain four decoded blocks $BD_{u0}$, $BD_{u1}$, $BD_{u2}$, $BD_{u3}$. Out of these four decoded blocks, just one is the true decoded block obtained from the coding of the current block $B_u$.

A test of the likelihood of each of the decoded blocks $BD_{u0}$, $BD_{u1}$, ..., $BD_{ud}$, ..., $BD_{uW-1}$ is then carried out, with a likelihood criterion, in which 0≤d<W.

Figure 4:
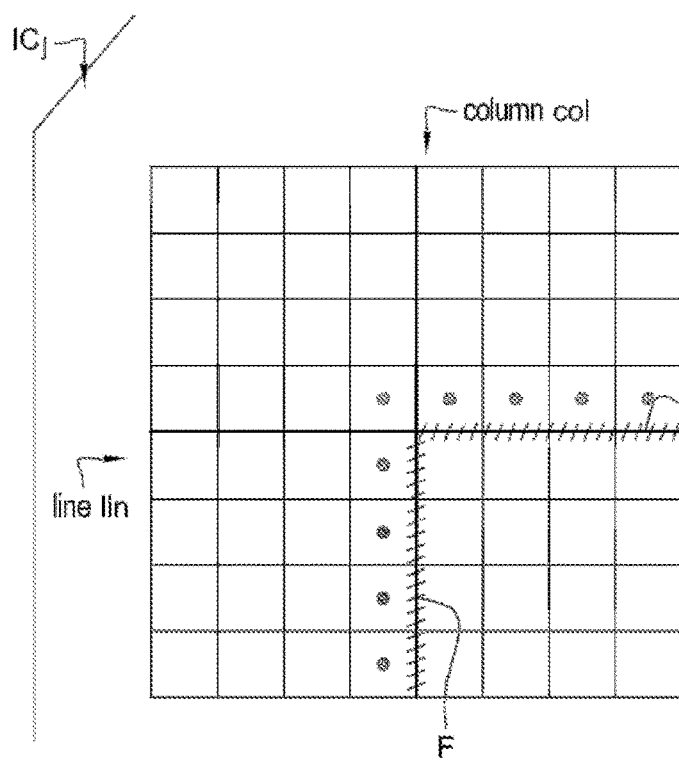
FIG. 4 represents an embodiment according to the invention of the step of identification of a predictor block as a function of the current decoded residue block obtained.

In this particular embodiment, the likelihood test consists in applying a criterion of minimization of the difference between the decoded pixels of the current image $IC_j$, which are represented by dots in FIG. 4, and the pixels of each decoded block $BD_{u0}$, $BD_{u1}$, ..., $BD_{ud}$, ..., $BD_{uW-1}$ along their respective boundary F represented by cross-hatchings in FIG. 4. This criterion is a mathematical operator denoted $SM(BD_{ud}, IC_j)$. The operator $SM(BD_{ud}, IC_j)$ is representative of the squared error along the boundary F of the decoded residual block $BDr_u$ with the image $IC_j$.

It is written as follows:

$$SM(IC_j, BD_{ud}) = \sum_{a=0}^{N-1}(BD_{ud}(0,a) - IC_j(lin-1, col-a))^2 + \sum_{a=0}^{N-1}(BD_{ud}(a,0) - IC_j(lin+a, col-1))^2$$

in which:
$BD_{ud}$ is the decoded block considered of size N×N pixels,
$BD_{ud}(n,m)$ is the value of the pixel of the decoded block $BD_{ud}$ situated on the nth line and the mth column of this block,
$IC_j$ is the current image,
$IC_j(k,l)$ is the value of the pixel of the image $IC_j$ situated on the kth line and on the lth column of this image, and (lin, col) are the coordinates of the decoded block $BD_{ud}$ in the image $IC_j$.

Alternatively, a simplified criterion can be used, in which the average of the pixels of the image $IC_j$ along the boundary F is compared to the average of the pixels of the decoded block $BD_{ud}$. The operator $SM(BD_{ud}, IC_j)$ is then written:

$$SM(BD_{ud}, IC_j) = \text{abs}\left(\frac{1}{(2N-1)}\sum_{a=0}^{N-1}(IC_j(lin-1, col+a) + IC_j(lin+a, col-1)) - \frac{1}{N^2}\sum_{a=0}^{N-1}\sum_{b=0}^{N-1}(BD_{ud}(a,b))\right)$$

in which abs( ) represents the absolute value.

The decoded block $BD_{udmin}$ which minimizes one of the two chosen abovementioned criteria is then determined, such that:

$dmin = \text{argmin}_d SM(BD_{ud}, PDIC_j)$ in which $PDIC_j$ represents the portion of the image $IC_j$ which has been decoded before the current block $B_u$.

The decoded residual block, out of the decoded residual blocks $BDr_{u0}$, $BDr_{u1}$, ..., $BDr_{uW-1}$, which is associated with the decoded block $BD_{udmin}$ is identified.

For this identified decoded residual block, the signs associated with the coefficients whose indexes $I_0$ to $I_{K-1}$ are contained in the list L are then considered as the predicted values of the signs of the coefficients of said residual block associated with the identified decoded residual block.

In the abovementioned example, if it is assumed that $BD_{udmin}=BD_{u0}$, the associated residual block is the block $Bq_{u0}$={5,0,−6,0,0,0,1,−1,0,3,0,0,0,3,1}. Since the signs assigned respectively to the fourteenth and fifteenth coefficients $\varepsilon_{14}$ and $\varepsilon_{15}$ are respectively the signs +,+, these two signs constitute the predicted sign values $Sp_1$ and $Sp_2$ of the signs $S_1$ and $S_2$ of the coefficients $\varepsilon_{14}$ and $\varepsilon_{15}$, whose indexes are contained in the list L.

During a step C12 represented in FIG. 1,
if only one predicted sign value $S_p$ has been obtained at the end of the step C11, an information item Id representative of the difference between the predicted value Sp of said sign and the value of the sign S to be coded is computed,
if a number of predicted sign values $Sp_1$ to $Sp_K$ have been obtained at the end of the step C11, an information item Id representative of the difference between the predicted sign values $Sp_1$ to $Sp_K$ and the values of the signs $S_1$ to $S_K$ to be coded is computed.

Such a computation step is performed by a computation software module CAL_CO, as represented in FIG. 2, said module being driven by the microprocessor μP of the processing unit UT_CO.

During a step C13 represented in FIG. 1, the computed information item Id is coded. To this end:
if the prediction of a sign performed in the step C11 is exact, the information item Id takes, for example, the binary value 0,
if the prediction of a sign performed in the step C11 is not exact, the information item Id takes, for example, the binary value 1.

In the abovementioned example regarding the coefficients $\varepsilon_{14}$ and $\varepsilon_{15}$ whose indexes have been obtained in the list L, the prediction of the signs is false since the predicted sign values $Sp_1$ and $Sp_2$ are respectively {+,+} whereas the values of the signs of the coefficients $\varepsilon_{14}$ and $\varepsilon_{15}$ are respectively {−,+}. Consequently, the indicator Id takes the binary values 01 to indicate that the prediction of the sign of the coefficient $\varepsilon_{14}$ is false and that the prediction of the sign of the coefficient $\varepsilon_{15}$ is exact.

Such a computation step is performed by an information coding software module MCI_CO, as represented in FIG. 2, said module being driven by the microprocessor μP of the processing unit UT_CO.

At the end of the coding steps C10 and C13, a signal or data stream φ which contains all of the encoded data of the block of quantized coefficients $Bq_u$ and the encoded identifier Id is then delivered. Such a stream is then transmitted by a communication network (not represented) to a remote terminal. The latter comprises the decoder DO represented in FIG. 5. As is known per se, the stream φ further comprises certain information items encoded by the coder CO, such as the type of prediction (inter or intra), and, if appropriate, the selected prediction mode, the type of partitioning of the block if the latter has been partitioned, the reference image index and the displacement vector used in the inter prediction mode.

During a step C14 represented in FIG. 1, the block $Bq_u$ is dequantized according to a conventional dequantization operation, which is the reverse operation of the quantization performed in the step C6. A block of dequantized coefficients $BDq_u$ is then obtained.

Such a dequantization step is performed by an inverse quantization software module $MT^{-1}\_CO$, as represented in FIG. 2, said module being driven by the microprocessor μP of the processing unit UT_CO.

During a step C15 represented in FIG. 1, the inverse transformation of the block of dequantized coefficients $BDq_u$, which is the reverse operation of the direct transformation performed in the above step C5, is carried out. A decoded residue block $BDr_u$ is then obtained.

Such an operation is performed by an inverse transform software module $MT^{-1}\_CO$, as represented in FIG. 2, said module being driven by the microprocessor μP of the processing unit UT_CO.

During a step C16 represented in FIG. 1, the decoded block $BD_u$ is constructed by adding to the predictor block $BP_{opt}$ obtained in the abovementioned step C3 the decoded residue block $BDr_u$. It should be noted that the latter block is the same as the decoded block obtained at the end of the image $IC_j$ decoding method which will be described later in the description. The decoded block $BD_u$ is then stored in the buffer memory MT_CO of FIG. 2, in order to be used by the coder CO as predictor block for a next block to be coded.

Such a step is implemented by an inverse predictive coding software module $PRED^{-1}\_CO$ represented in FIG. 2, said module being driven by the microprocessor μP of the processing unit UT_CO.

During a step C17 represented in FIG. 1, the coder CO tests to see if the current block $B_u$ which has just been coded is the last block of the image $IC_j$.

If the current block is the last block of the image $IC_j$, during a next step C18 represented in FIG. 1, the coding method is terminated.

It such is not the case, the step C2 of selection of the next block to be coded is carried out once again according to the abovementioned raster scan run-through order, then the steps C3 to C17 are reiterated for this next selected block.

The coding steps which have just been described above are implemented for all the blocks $B_1, B_2, \ldots, B_u, \ldots, B_S$ to be coded of the current image $IC_j$ considered.

Detailed Description of the Decoding Part

An embodiment of the decoding method according to the invention will now be described, in which the decoding method is implemented in a software or hardware manner by modifications to a decoder initially conforming to the HEVC standard. The decoding method according to the invention is represented in the form of an algorithm comprising steps D1 to D15 as represented in FIG. 6.

Figure 5:
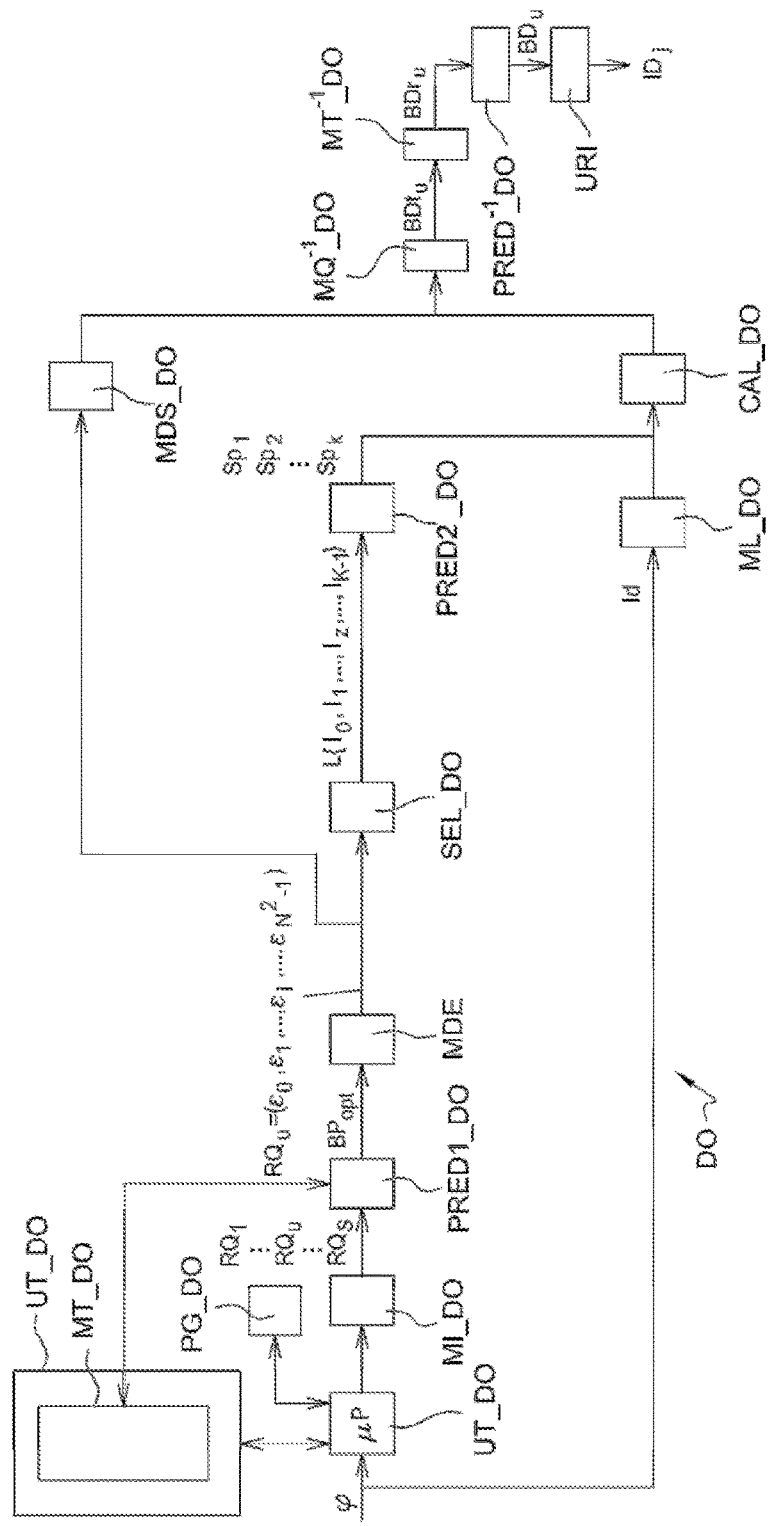
FIG. 5 represents an embodiment of a decoding device according to the invention.

As illustrated in FIG. 5, the decoder DO according to this embodiment of the invention comprises a memory MEM_DO comprising a buffer memory MT_DO, a processing unit UT_DO equipped for example with a microprocessor μP and driven by a computer program PG_DO which implements the decoding method according to the invention. On initialization, the code instructions of the computer program PG_DO are for example loaded into a RAM memory before being executed by the processor of the processing unit UT_DO.

Figure 6:
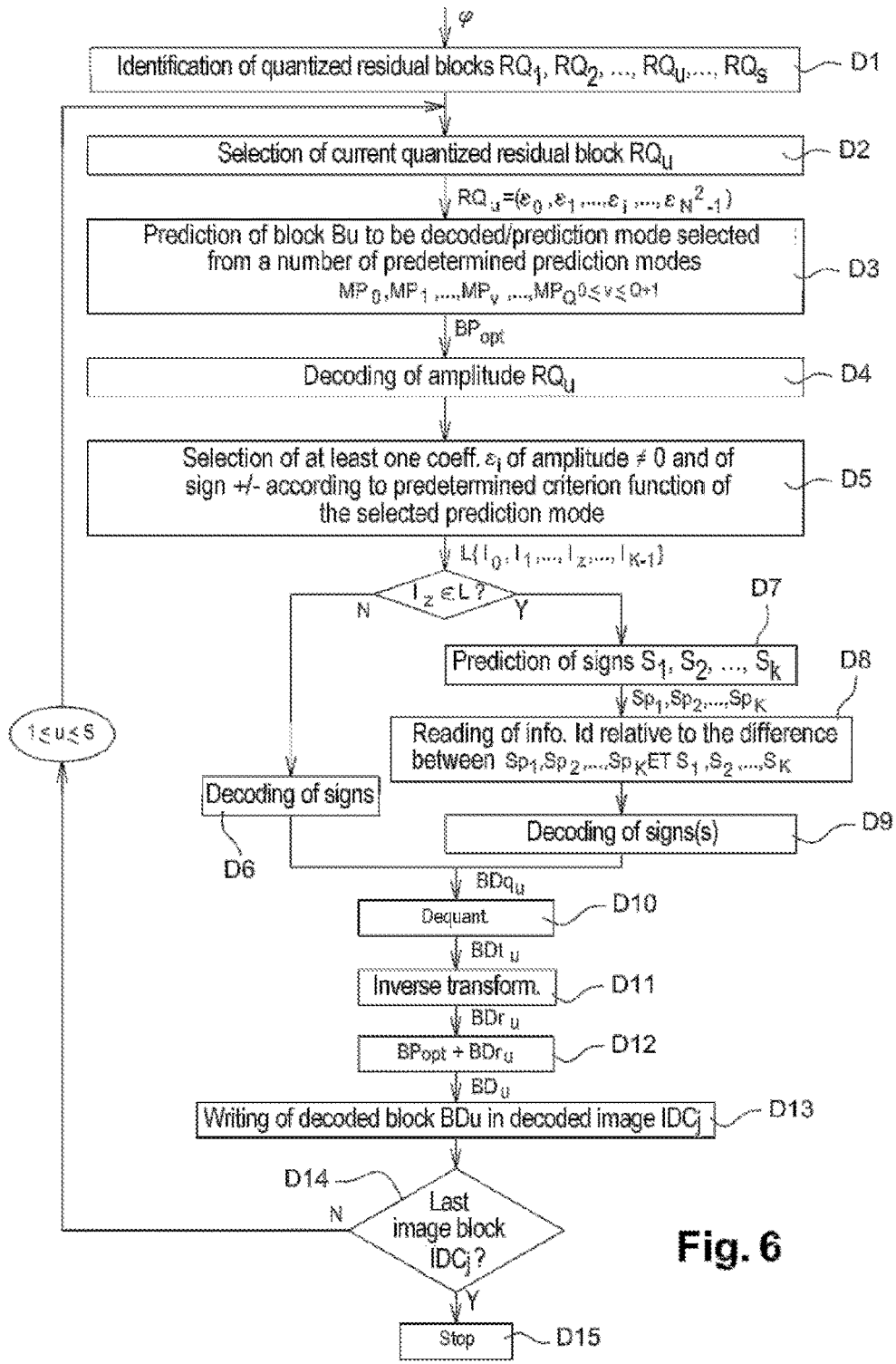
FIG. 6 represents the main steps of the decoding method according to the invention.

The decoding method represented in FIG. 6 is applied to any current image of a sequence SQ of images to be decoded.

To this end, information items representative of the current image $IC_j$ to be decoded are identified in a signal or data stream φ received on the decoder, as delivered following the coding method of FIG. 1.

Referring to FIG. 6, during a step D1, the quantized residues $RQ_1, RQ_2, \ldots, RQ_u, \ldots RQ_S$ (1≤u≤S) associated respectively with the blocks $B_1, B_2, \ldots, B_u, \ldots, B_S$ coded previously in accordance ith the abovementioned raster scan run-through, in accordance with the coding method of FIG. 1, are identified in said stream φ.

Such an identification step is implemented by a stream analysis identification module MI_DO, as represented in FIG. 5, said module being driven by the microprocessor μP of the processing unit UT_DO.

Said quantized residues $RQ_1, RQ_2, \ldots, RQ_u, \ldots, RQ_S$ are intended to be decoded in a predetermined run-through order, which is for example sequential, that is to say that said residues are intended to be decoded one after the other in accordance with the raster scan order in which they were coded.

Run-through types other than that which has just been described above are of course possible and depend on the run-through order chosen on coding, examples of which have been mentioned above.

In the preferred embodiment, the blocks to be decoded have a square form and all have the same size. Depending on the size of the image which is not necessarily a multiple of the size of the blocks, the last blocks on the left and the last blocks at the bottom may not be square. In an alternative embodiment, the blocks may for example be of rectangular size and/or not aligned with one another.

Each block may moreover be itself divided into subblocks which are themselves subdivisible.

During a step D2 represented in FIG. 6, the decoder DO of FIG. 5 selects, as current block, a first quantized residue $RQ_u = (\varepsilon_0, \varepsilon_1, \ldots, \varepsilon_i, \ldots, \varepsilon_{N^2-1})$ of coefficients to be decoded, in which the index i varies from 0 to $N^2-1$.

During a step D3 represented in FIG. 6, the current block $B_u$ to be decoded is predicted by known intra and/or inter prediction techniques. To this end, the block $B_u$ to be decoded is predicted in relation to at least one predictor block in accordance with a prediction mode selected from a plurality of predetermined prediction modes $MP_0, MP_1, \ldots, MP_v, \ldots, MP_Q$ in which 0≤v≤Q+1. In the example represented, the predetermined prediction modes are of intra type and Q is equal to 4.

According to a first variant embodiment, the selected prediction mode is directly read in the stream φ where in the case where the coder CO of FIG. 2 has signaled this mode to the decoder DO of FIG. 5.

According to a second variant embodiment, the prediction mode is selected on the decoder DO by putting said predetermined prediction modes into competition with one another, for example by minimization of a distortion bit rate criterion well known to those skilled in the art.

Such a predictor block is for example a block of pixels which has already been decoded or not. Such a predictor block is previously stored in the buffer memory MT_DO of the decoder DO as represented in FIG. 5.

At the end of the prediction step D3, an optimum predictor block $BP_{opt}$ conforming to the selected prediction mode is obtained. The block $BP_{opt}$ is an approximation of the current block $B_u$ to be decoded. The information items relative to this prediction are read in the data stream φ. Such information items notably comprise the type of prediction (inter or intra), the type of partitioning of the current block if the latter has been subdivided, the reference image index and the displacement vector used in the case where an inter prediction mode has been selected. These information items will be decoded later in a conventional manner.

The step D3 is implemented by a predictive decoding software module PRED1_DO represented in FIG. 5, said module being driven by the microprocessor µP of the processing unit UT_DO.

During a step D4 represented in FIG. 6, the amplitude information items associated with each coefficient of the one-dimensional vector $RQ_u$ are decoded. In the preferred embodiment, the decoding performed is an entropic decoding of arithmetic or Huffman type. The step D4 then consists in:

reading the symbol or symbols of the predetermined set of symbols which are associated with said current block to be decoded, associating digital information items, such as bits, with the symbol(s) read.

Such a step of entropic decoding is implemented by an entropic decoding software module MDE represented in FIG. 5, said module being driven by the microprocessor µP of the processing unit UT_DO. The entropic decoding module MDE is for example of CABAC type. It can also be a Huffman decoder known as such.

During a step D5 represented in FIG. 6, at least one coefficient of the one-dimensional vector $RQ_u$ having a non-zero amplitude and a + or − sign is selected.

According to the invention, such a selection is advantageously implemented using a predetermined criterion which is a function of the prediction mode selected in the prediction step D3.

The selection step D5 is in all respects identical to the selection step C9 performed in the coding with reference to FIG. 1.

Such a selection step is performed by a selection software module SEL_DO, as represented in FIG. 5, said module being driven by the microprocessor µP of the processing unit UT_DO.

According to the preferred embodiment of the step D5, said predetermined selection criterion consists of a table TA stored in a memory (not represented) of the decoder DO which associates, with each of said predetermined prediction modes, an ordered list of the coefficients of the one-dimensional vector $RQ_u$, the order of the coefficients of a list being variable from one prediction mode to another.

An example of the table TA is represented below. In this example, there are sixteen coefficients $\varepsilon_0, \varepsilon_1, \ldots, \varepsilon_i, \ldots, \varepsilon_{N^2-1}$ and there are five predetermined prediction modes $MP_0, MP_1, MP_2, MP_3, MP_4$. The table TA then takes the following form:

7, 8, 9, 10, 11. A test is then run in this order to see if the amplitude of each of the coefficients $\varepsilon_{12}, \varepsilon_{13}, \varepsilon_{14}, \varepsilon_{15}, \varepsilon_0, \varepsilon_1, \varepsilon_2, \varepsilon_3, \varepsilon_4, \varepsilon_5, \varepsilon_6, \varepsilon_7, \varepsilon_8, \varepsilon_9, \varepsilon_{10}, \varepsilon_{11}$ is zero or not. The first K values of non-zero amplitude are retained, in which K is a value predetermined on the decoder DO, such that $0 \leq K \leq N^2 - 1$.

Thus, if for example K is 2, and the coefficients of the one-dimensional vector $RQ_u$ are for example as follows: $\varepsilon_0 = 5, \varepsilon_1 = 0, \varepsilon_2 = -6, \varepsilon_3 = 0, \varepsilon_4 = 0, \varepsilon_5 = 0, \varepsilon_6 = 1, \varepsilon_7 = -1, \varepsilon_8 = 0, \varepsilon_9 = 3, \varepsilon_{10} = 0, \varepsilon_{11} = 0, \varepsilon_{12} = 0, \varepsilon_{13} = 0, \varepsilon_{14} = -3, \varepsilon_{15} = 1$, the first two non-zero amplitude values identified are 3 ($\varepsilon_{14}$) and 1 ($\varepsilon_{15}$), which thus constitute a subset of identified coefficients. A list $L = \{I_0, I_1, \ldots, I_z, \ldots, I_{K-1}\}$ ($0 \leq z < K$) containing the indexes of K coefficients identified in said subset is then constructed. In the example represented in which K=2, L={14,15}.

According to an alternative embodiment, an order by increasing or decreasing non-zero amplitude of the coefficients of the one-dimensional vector $RQ_u$ is selected as a function of the predetermined prediction mode which has been selected to predict the current block $B_u$ to be decoded.

In the case for example where there are two predetermined prediction modes $M_0$ and $M_1$:

if it is the mode $M_0$ which has been selected to predict the current block, the first K coefficients of the one-dimensional vector $RQ_u$ are selected by decreasing non-zero amplitude, if it is the mode $M_1$ which has been selected to predict the current block, the first K coefficients of the one-dimensional vector $RQ_u$ are selected by increasing non-zero amplitude.

The inverse variant is also possible. That is to say that:

if the mode $M_0$ which has been selected to predict the current block, the first K coefficients of the one-dimensional vector $RQ_u$ are selected by increasing non-zero amplitude, if it is the mode $M_1$ which has been selected to predict the current block, the first K coefficients of the one-dimensional vector $RQ_u$ are selected by decreasing non-zero amplitude.

The abovementioned examples of selection criterion are in no way limiting, provided that the criterion takes account of the prediction mode selected in the prediction step D3, for identifying the coefficient for which the sign will be the most predictable.

At the end of the selection step D5, a list $L = \{I_0, I_1, \ldots, I_z, \ldots, I_{K-1}\}$ ($0 \leq z < K$) is obtained containing the indexes of K coefficients of the one-dimensional vector $RQ_u$.

| | TA | Coefficients $\varepsilon_0, \varepsilon_1, \varepsilon_2, \varepsilon_3, \varepsilon_4, \varepsilon_5, \varepsilon_6, \varepsilon_7, \varepsilon_8, \varepsilon_9, \varepsilon_{10}, \varepsilon_{11}, \varepsilon_{12}, \varepsilon_{13}, \varepsilon_{14}, \varepsilon_{15}$ Sequencing of the Coefficients by Index i with $0 \leq i \leq 15$ | | | | | | | | | | | | | | | |
|---|---|---|---|---|---|---|---|---|---|---|---|---|---|---|---|---|---|
| Prediction Modes | $MP_0$ | 0 | 1 | 2 | 3 | 4 | 5 | 6 | 7 | 8 | 9 | 10 | 11 | 12 | 13 | 14 | 15 |
| | $MP_1$ | 8 | 9 | 10 | 11 | 12 | 13 | 14 | 15 | 0 | 1 | 2 | 3 | 4 | 5 | 6 | 7 |
| | $MP_2$ | 4 | 5 | 6 | 7 | 8 | 9 | 10 | 11 | 0 | 1 | 2 | 3 | 12 | 13 | 14 | 15 |
| | $MP_3$ | 12 | 13 | 14 | 15 | 0 | 1 | 2 | 3 | 4 | 5 | 6 | 7 | 8 | 9 | 10 | 11 |
| | $MP_4$ | 15 | 14 | 13 | 12 | 11 | 10 | 9 | 8 | 7 | 6 | 5 | 4 | 3 | 2 | 1 | 0 |

During the selection step D5, in the table TA, the line which corresponds to the prediction mode which was used to predict the current block $B_u$ to be decoded is chosen. For example, if it is the prediction mode $MP_3$, the line of indexes of coefficients corresponding to this prediction mode is selected. The coefficients $\varepsilon_0$ to $\varepsilon_{15}$ are then run through in the order given by the selected line of coefficient indexes, in other words, respectively, 12, 13, 14, 15, 0, 1, 2, 3, 4, 5, 6, During a step D6 represented in FIG. 6, the signs of the coefficients of the one-dimensional vector $RQ_u$ whose indexes have not been retained in the list L are decoded in a conventional manner.

Such a decoding step is performed by a sign decoding software module MDS_DO as represented in FIG. 5, said module being driven by the microprocessor µP of the processing unit UT_DO.

In the abovementioned example in which the coefficients of the one-dimensional vector $RQ_u$ are as follows: $\varepsilon_0=5$, $\varepsilon_1=0$, $\varepsilon_2=-6$, $\varepsilon_3=0$, $\varepsilon_4=0$, $\varepsilon_5=0$, $\varepsilon_6=1$, $\varepsilon_7=-1$, $\varepsilon_8=0$, $\varepsilon_9=3$, $\varepsilon_{10}=0$, $\varepsilon_{11}=0$, $\varepsilon_{12}=0$, $\varepsilon_{13}=0$, $\varepsilon_{14}=-3$, $\varepsilon_{15}=1$, the signs of the coefficients that are non-zero and whose indexes are not present in the list L={14, 15} are conventionally decoded. The signs+, −, +, −, + corresponding respectively to the coefficients $\varepsilon_0$, $\varepsilon_2$, $\varepsilon_6$, $\varepsilon_7$, $\varepsilon_9$ are then decoded. As is known per se, the + sign is reconstructed by reading a zero bit in the stream φ, whereas the − sign is reconstructed by reading a one bit in the stream φ.

During a step D7 represented in FIG. 6, the sign or signs of the coefficients whose indexes have been retained in the list L are predicted.

Such a sign prediction step is performed by a sign prediction software module PRED2_DO as represented in FIG. 5, said module being driven by the microprocessor μP of the processing unit UT_DO. Said sign prediction step D7 is in all respects identical to the sign prediction step C11 performed in the decoding with reference to FIG. 1.

In the case where a single sign is predicted, a single predicted sign value Sp is obtained.

In the case where K signs $S_1, S_2, \ldots, S_K$ are predicted, a number of predicted sign values $Sp_1, Sp_2, \ldots, Sp_K$ are respectively obtained.

In the abovementioned example where L={14, 15}, two predicted sign values $Sp_1$ and $Sp_2$ are intended to be obtained.

According to an example of sign prediction known as such, for a current quantized residual block $Bq_u$ considered, as many decoded blocks as there are combinations of the signs of the coefficients whose indexes are contained in the list L are constructed. Generally, since there are two possible signs+ or − for a coefficient, for a current quantized residual block $Bq_u$ considered:

W current quantized residual blocks $Bq_{u0}, Bq_{u1}, \ldots, Bq_{uW-1}$ where $W=2^K$ are constructed, the W current quantized residual blocks $Bq_{u0}, Bq_{u1}, \ldots, Bq_{uW-1}$ are decoded to respectively obtain W decoded residual blocks $BDr_{u0}, BDr_{u1}, BDr_{uW-1}$, using conventional dequantization and inverse prediction techniques, W decoded blocks $BDu_0, BDu_1, \ldots, BDu_{W-1}$ are reconstructed by respectively adding, to the W decoded residual blocks $BDr_{u0}, BDr_{u1}, \ldots, BDr_{uW-1}$, the predictor block $BP_{opt}$ obtained at the end of the abovementioned prediction step D3.

In the abovementioned example, there are two signs to be predicted, the − sign assigned to the coefficient $\varepsilon_{14}$ and the + sign assigned to the coefficient $\varepsilon_{15}$. These two signs can therefore take the values {+,+}, {+,−}, {−,+} and {−,−}. Thus, for example, for the list L={14, 15}, $2^2=4$ residual blocks $Bq_{u0}, Bq_{u1}, Bq_{u2}, Bq_{u3}$ are obtained such that:

$Bq_{u0}=\{5,0,-6,0,0,0,1,-1,0,3,0,0,0,3,1\}$
$Bq_{u1}=\{5,0,-6,0,0,0,1,-1,0,3,0,0,0,3,-1\}$
$Bq_{u2}=\{5,0,-6,0,0,0,1,-1,0,3,0,0,0,-3,1\}$
$Bq_{u3}=\{5,0,-6,0,0,0,1,-1,0,3,0,0,0,-3,-1\}$

Each of these four residual blocks are decoded so as to respectively obtain four decoded residual blocks $BDr_{u0}$, $BDr_{u1}, BDr_{u2}, BDr_{u3}$. Then, the predictor block $BP_{opt}$ obtained in the abovementioned prediction step D3 is added to each of these four decoded residual blocks, which makes it possible to obtain four decoded blocks $BD_{u0}, BD_{u1}, BD_{u2}, BD_{u3}$. Of these four decoded blocks, only one is the true decoded block as obtained at the end of the decoding of the current block $B_u$ to be decoded.

A test of the likelihood of each of the decoded blocks $BD_{u0}, BD_{u1}, \ldots, BD_{ud}, \ldots, BD_{uW-1}$, is then carried out, with the likelihood criterion.

In this particular embodiment, the likelihood test consists in applying a criterion of minimization of the difference between the decoded pixels of the current image $IC_j$, which are represented by dots in FIG. 4, and the pixels of each decoded block $BD_{u0}, BD_{u1}, \ldots, BD_{ud}, \ldots, BD_{uW-1}$ along their respective boundary F represented by cross-hatchings in FIG. 4. This criterion is a mathematical operator denoted $SM(BD_{ud}, IC_j)$. The operator $SM(BD_{ud}, IC_j)$ is representative of the squared error along the boundary F of the decoded residual block $BDr_u$ with the image $IC_j$.

It is written as follows:

$$SM(IC_j, BD_{ud}) = \sum_{a=0}^{N-1} (BD_{ud}(0, a) - IC_j(lin-1, col+a))^2 +$$

$$\sum_{a=0}^{N-1} (BD_{ud}(a, 0) - IC_j(lin+a, col-1))^2$$

in which:
$BD_{ud}$ is the decoded block considered of N×N pixel size,
$BD_{ud}(n,m)$ is the value of the pixel of the decoded block $BD_{ud}$ situated on the nth line and the mth column of this block,
$IC_j$ is the current image,
$IC_j(k,l)$ is the value of the pixel of the image $IC_j$ situated on the kth line and the lth column of this image, and
(lin,col) are the coordinates of the decoded block $BD_{ud}$ in the image $IC_j$.

Alternatively, a simplified criterion can be used, in which the average of the pixels of the image $IC_j$ along the boundary F is compared to the average of the pixels of the decoded block $BD_{ud}$. The operator $SM(BD_{ud}, IC_j)$ is then written:

$$SM(BD_{ud}, IC_j) =$$
$$\text{abs}\left(\frac{1}{(2N-1)}\sum_{a=0}^{N-1}(IC_j(lin-1, col+a) + IC_j(lin+a, col-1)) - \frac{1}{N^2}\sum_{a=0}^{N-1}\sum_{b=0}^{N-1}(BD_{ud}(a, b))\right)$$

in which abs( ) represents the absolute value.

The decoded block $BD_{udmin}$ which minimizes one of the abovementioned two chosen criteria is determined, such that:

$$dmin=\text{argmin}_d SM(BD_{ud}, PDIC_j)$$

in which $PDIC_j$ represents the portion of the image $IC_j$ which has been decoded before the current block $B_u$ to be decoded.

The decoded residual block which is associated with the decoded block $BD_{udmin}$ is identified among the decoded residual blocks $BDr_{u0}, BDr_{u1}, \ldots, BDr_{uW-1}$.

For this identified decoded residual block, the signs associated with the coefficients whose indexes $I_0$ to $I_{K-1}$ are contained in the list L are then considered as the predicted values of the signs of the coefficients of said residual block associated with the identified decoded residual block.

In the abovementioned example, if it is assumed that $BD_{udmin}=BD_{u0}$, the associated residual block is the block $Bq_{u0}=\{5,0,-6,0,0,0,1,-1,0,3,0,0,0,3,1\}$. Since the signs assigned respectively to the fourteenth and fifteenth coefficients $\epsilon_{14}$ and $\epsilon_{15}$ are respectively the signs +,+, these two signs constitute the predicted sign values $Sp_1$ and $Sp_2$ of the signs $S_1$ and $S_2$ of the coefficients $\epsilon_{14}$ and $\epsilon_{15}$, whose indexes are contained in the list L.

During a step D8 represented in FIG. 6, an information item Id is read in the stream φ that is representative of the difference between:
- the predicted value Sp of said sign and the value of the sign S to be decoded, if just one predicted sign value $S_p$ was obtained at the end of the step D7,
- the predicted sign values $Sp_1$ to $Sp_K$ and respectively the values of the signs $S_1$ to $S_K$ to be decoded, if a number of predicted sign values $Sp_1$ to $Sp_K$ were obtained at the end of the step D7.

Such a reading step is performed by a reading software module ML_DO as represented in FIG. 5, said module being driven by the microprocessor µP of the processing unit UT_DO.

During a step D9 represented in FIG. 6 the information item Id read previously is decoded. To this end:
- if the prediction of a sign performed in the step D7 is exact, the information item Id read is for example a 0 bit,
- if the prediction of a sign performed in the step D7 is not exact, the information item Id read is for example a 1 bit.

In the abovementioned example regarding the coefficients $\epsilon_{14}$ and $\epsilon_{15}$ whose indexes have been retained in the list L, the prediction of the signs is false since the predicted sign values $Sp_1$ and $Sp_2$ are respectively $\{+,+\}$ whereas the values of the signs of the coefficients $\epsilon_{14}$ and $\epsilon_{15}$ are respectively $\{-,+\}$. Consequently, the information item Id read is "01" to indicate that the prediction of the sign of the coefficient $\epsilon_{14}$ is false and that the prediction of the sign of the coefficient $\epsilon_{15}$ is exact.

Such a sign decoding step is performed by a computation software module CAL_DO as represented in FIG. 5, said module being driven by the microprocessor µP of the processing unit UT_DO.

During a step D10 represented in FIG. 6, the quantized residue $RQ_u$ is dequantized, according to a conventional dequantization operation, which is in all respects identical to the dequantization step performed in the step C14 of FIG. 1. A decoded dequantized block $BDt_u$ is then obtained.

Such a dequantization step is performed by an inverse quantization software module $MQ^{-1}$_DO as represented in FIG. 5, said module being driven by the microprocessor µP of the processing unit UT_DO.

During a step D11 represented in FIG. 6, the inverse transformation of the block of dequantized coefficients $BDt_u$ is performed, which is in all respects identical to the inverse transformation step performed in the step C15 of FIG. 1. A decoded residue block $BDr_u$ is then obtained.

Such an operation is performed by an inverse transform software module $MT^{-1}$_DO, as represented in FIG. 5, said module being driven by the microprocessor µP of the processing unit UT_DO.

During a step D12 represented in FIG. 6, the current block $B_u$ is reconstructed by adding to the decoded current residual block $BDr_u$ the predictor block $BP_{opt}$ obtained in the step D3.

Said step D12 is implemented by an inverse prediction software module $PRED^{-1}$_DO represented in FIG. 5, said module being driven by the microprocessor µP of the processing unit UT_DO.

A decoded block $BD_u$ is then obtained and stored in the buffer memory MT_DO of FIG. 5, in order to be used by the decoder DO as predictor block for a next block to be decoded.

During a step D13 represented in FIG. 6, said decoded block $BD_u$ is written into a decoded image $ID_j$. Such a step is implemented by an image reconstruction software module URI as represented in FIG. 5, said module being driven by the microprocessor µP of the processing unit UT_DO.

During a step D14 represented in FIG. 6, the decoder DO tests to see if the current block $BD_u$ which has just been decoded is the last block contained in the stream φ.

If such is the case, during a step D15 represented in FIG. 6, the decoding method is terminated.

If such is not the case, the next residual block to be decoded according to the abovementioned raster scan runthrough order is selected in the step D2.

The decoding steps which have just been described above are implemented for all the blocks $B_1, B_2, \ldots, B_u, \ldots, B_S$ to be decoded of the current image $IC_j$ considered.

It goes without saying that the embodiments which have been described above have been given in a purely indicative and nonlimiting manner, and that numerous modifications can easily be made by those skilled in the art without in any way departing from the scope of the invention.

The invention claimed is:

1. A coding method for coding at least one image subdivided into blocks, implementing, for a current block of N×N pixels to be coded, where N≥1, the following acts performed by a coding device:
   predicting the current block in accordance with a prediction mode selected from a plurality of predetermined prediction modes,
   obtaining a predictor block,
   determining a set of N×N residual data representative of a difference between the predictor block obtained and the current block, said residual data being likely to have an amplitude and a sign,
   computing a set of N×N coefficients from said set of residual data,
   scanning the coefficients of said set of N×N coefficients according a given order, delivering a set of $N^2$ coefficients,
   coding the amplitude of each coefficient of said set of $N^2$ coefficients,
   wherein for the coefficients of said set of $N^2$ coefficients that have a sign:
      selecting, from said set of $N^2$ coefficients, a subset of coefficients whose sign is the most predictable, said subset containing the first K coefficients assigned a non-zero amplitude and a sign, using a predetermined criterion which is a function of the selected prediction mode,
      obtaining K predicted values of the sign of respectively said first K coefficients,
      computing an information item representative of the difference between said K predicted values of sign and respectively said K values of sign,
      coding said computed information item,
      coding the signs of the coefficients that have not been selected.

2. The coding method as claimed in claim 1, in which the act of obtaining the K predicted values of the sign of respectively said first K selected coefficients is a function of previously coded then decoded pixels of the current image which are situated along the current block.

3. The coding method as claimed in claim 1, in which the predetermined criterion for selecting said first K coefficients comprises a table which associates, with each of said predetermined prediction modes, an ordered list of said $N^2$ coefficients, the order of the coefficients of a list being variable from one prediction mode to another.

4. A device for coding at least one image subdivided into blocks, comprising, for a current block of N×N pixels to be coded, where N≥1:
  means for predicting the current block in accordance with a prediction mode selected from a plurality of predetermined prediction modes,
  means for determining a set of N×N residual data representative of a difference between a predictor block, obtained following activation of said prediction means, and the current block, said residual data being likely to have an amplitude and a sign,
  means for computing a set of N×N coefficients from said set of residual data,
  means for scanning the coefficients of said set of N×N coefficients according a given order, delivering a set of $N^2$ coefficients,
  means for coding the amplitude of each coefficient of said set of $N^2$ coefficients, wherein for the coefficients of said set of $N^2$ coefficients that have a sign, said device comprises:
  means for selecting, from said set of $N^2$ coefficients, a subset of coefficients whose sign is the most predictable, said subset containing the first K coefficients assigned a non-zero amplitude and a sign, using a predetermined criterion which is a function of the selected prediction mode,
  means for obtaining K predicted values of sign of respectively said K first selected coefficients,
  means for computing an information item representative of a difference between said K predicted values of sign and respectively said K values of sign,
  means for coding said computed information item, and
  means for coding the signs of the coefficients that have not been selected.

5. A non-transitory computer-readable storage medium on which is stored a computer program comprising instructions for executing a method of coding at least one image subdivided into blocks, when said program is run on a computer of a coding device, wherein the instructions configure the coding device to implement the following acts for a current block of N×N pixels to be coded, where N≥1:
  predicting the current block in accordance with a prediction mode selected from a plurality of predetermined prediction modes,
  obtaining a predictor block,
  determining a set of N×N residual data representative of a difference between the predictor block obtained and the current block, said residual data being likely to have an amplitude and a sign,
  computing a set of N×N coefficients from said set of residual data,
  scanning the coefficients of said set of N×N coefficients according a given order, delivering a set of $N^2$ coefficients,
  coding the amplitude of each coefficient of said set of $N^2$ coefficients,
  wherein for the coefficients of said set of $N^2$ coefficients that have a sign:
  selecting, from said set of $N^2$ coefficients, a subset of coefficients whose sign is the most predictable, said subset containing the first K coefficients assigned a non-zero amplitude and a sign, using a predetermined criterion which is a function of the selected prediction mode,
  obtaining K predicted values of sign of respectively said K first selected coefficients,
  computing an information item representative of the difference between said K predicted values of sign and respectively said K values of sign,
  coding said computed information item, and
  coding the signs of the coefficients that have not been selected.

6. A decoding method for decoding a data signal representative of at least one image subdivided into blocks, implementing, for a current block of N×N pixels to be decoded, where N≥1, the following acts performed by a decoding device:
  determining, in said data signal, a set of $N^2$ coefficients relative to said current block, at least one coefficient of said set being assigned an amplitude and a sign,
  predicting the current block in accordance with a prediction mode selected from a plurality of predetermined prediction modes,
  decoding the amplitude of each coefficient of said set of $N^2$ coefficients,
  wherein for the coefficients of said set of $N^2$ coefficients that have a sign:
  selecting, from said set of coefficients, a subset of coefficients whose sign is the most predictable, said subset containing the first K coefficients assigned a non-zero amplitude and a sign, using a predetermined criterion which is a function of the determined prediction mode,
  obtaining K predicted values of the sign of respectively said first K coefficients,
  determining, in said data signal, an information item representative of a difference between said K predicted values of sign and respectively the K values of sign of said first K coefficients,
  reconstructing said K signs using said K predicted values of sign and said determined representative information item, and
  decoding the signs of the coefficients that have not been selected.

7. The decoding method as claimed in claim 6, in which the act of obtaining said K predicted values of the sign of respectively said first K selected coefficients is a function of previously decoded pixels of the current image which are situated along the current block.

8. The decoding method as claimed in claim 6, in which the predetermined criterion for selecting said first K coefficients comprises a table which associates, with a determined prediction mode, an ordered list of said $N^2$ coefficients, the order of the coefficients of a list being variable from one prediction mode to another.

9. A device for decoding a data signal representative of at least one image subdivided into blocks, comprising, for a current block of N×N pixels to be decoded, where N≥1:
  means for determining, in said data signal, a set of $N^2$ coefficients relative to said current block, at least one coefficient of said set being assigned an amplitude and a sign,
  means for predicting the current block in accordance with a prediction mode selected from a plurality of predetermined prediction modes,
  means for decoding the amplitude of each coefficient of said set of $N^2$ coefficients,
  wherein for the coefficients of said set of $N^2$ coefficients that have a sign, said device comprises:

means for selecting, from said set of coefficients, a subset of coefficients whose sign is the most predictable, said subset containing the first K coefficients assigned a non-zero amplitude and a sign, using a predetermined criterion which is a function of the determined prediction mode, means for obtaining K predicted values of the sign of respectively said first K coefficients, means for determining, in said data signal, an information item representative of a difference between said K predicted values of sign and respectively the K values of sign of said first K coefficients, means for reconstructing said K signs using said K predicted values of sign and said determined representative information item, and means for decoding the signs of the coefficients that have not been selected.

10. A non-transitory computer-readable storage medium on which is stored a computer program comprising instructions for executing a method of decoding a data signal representative of at least one image subdivided into blocks, when said program is run on a computer of a decoding device, wherein the instructions configure the decoding device to implement, for a current block of N×N pixels to be decoded, where N≥1, the following acts:

determining, in said data signal, a set of $N^2$ coefficients relative to said current block, at least one coefficient of said set being assigned an amplitude and a sign, predicting the current block in accordance with a prediction mode selected from a plurality of predetermined prediction modes, decoding the amplitude of each coefficient of said set of $N^2$ coefficients, wherein for the coefficients of said set of coefficients that have a sign:

selecting, from said set of coefficients, a subset of coefficients whose sign is the most predictable, said subset containing the first K coefficients assigned non-zero amplitude and a sign, using a predetermined criterion which is a function of the determined prediction mode, obtaining K predicted values of the sign of respectively said first K coefficients, determining, in said data signal, an information item representative of a difference between said K predicted values of sign and respectively the K values of sign of said first K coefficients, reconstructing said K signs using said K predicted values of said sign and said determined representative information item, and decoding the signs of the coefficients that have not been selected.

* * * * *